United States Patent [19]

Hughes

[11] Patent Number: 4,876,694
[45] Date of Patent: Oct. 24, 1989

[54] EXTERNAL CAVITY SLAB LASERS

[75] Inventor: John L. Hughes, Torrens, Australia

[73] Assignee: Advanced Lasers Limited, Canberra City, Australia

[21] Appl. No.: 289,500

[22] Filed: Dec. 23, 1988

Related U.S. Application Data

[63] Continuation of Ser. No. 882,678, Jul. 7, 1986, abandoned.

[51] Int. Cl.$^4$ .............................................. H01S 3/081
[52] U.S. Cl. ........................................... 372/93; 372/66; 372/68; 372/70; 372/108; 372/35
[58] Field of Search ..................... 372/66, 68, 70, 72, 372/92, 93, 99, 108, 34, 35

[56] References Cited

U.S. PATENT DOCUMENTS

| 1,278,026 | 9/1918 | Salto | 372/92 |
| 3,413,567 | 11/1968 | Hannwacker et al. | 372/36 |
| 3,633,126 | 1/1972 | Martin et al. | 372/35 |
| 3,665,335 | 5/1972 | Tomiyasu | 372/66 |
| 4,214,216 | 7/1980 | Jones, Jr. | 372/92 |
| 4,517,677 | 5/1985 | Altman | 372/66 |
| 4,528,671 | 7/1985 | Robbins | 372/66 |
| 4,563,763 | 1/1986 | Kuhn | 372/66 |

Primary Examiner—John D. Lee
Assistant Examiner—B. R. R. Holloway
Attorney, Agent, or Firm—Balogh, Osann, Kramer, Dvorak, Genova & Traub

[57] ABSTRACT

This invention relates to an external cavity slab laser system for pulsed or continuous wave operation consisting of an optically excited, water cooled single or multiple active mirror slab configurations with the external cavity formed by the active mirror and a passive mirror set parallel to each other and separated from each other by a distance greater than the thickness of the slab. Laser beams of both circular and elliptical cross-section can be amplified by the invention which has application in medical apparatus, industrial workstations and defense systems.

9 Claims, 2 Drawing Sheets

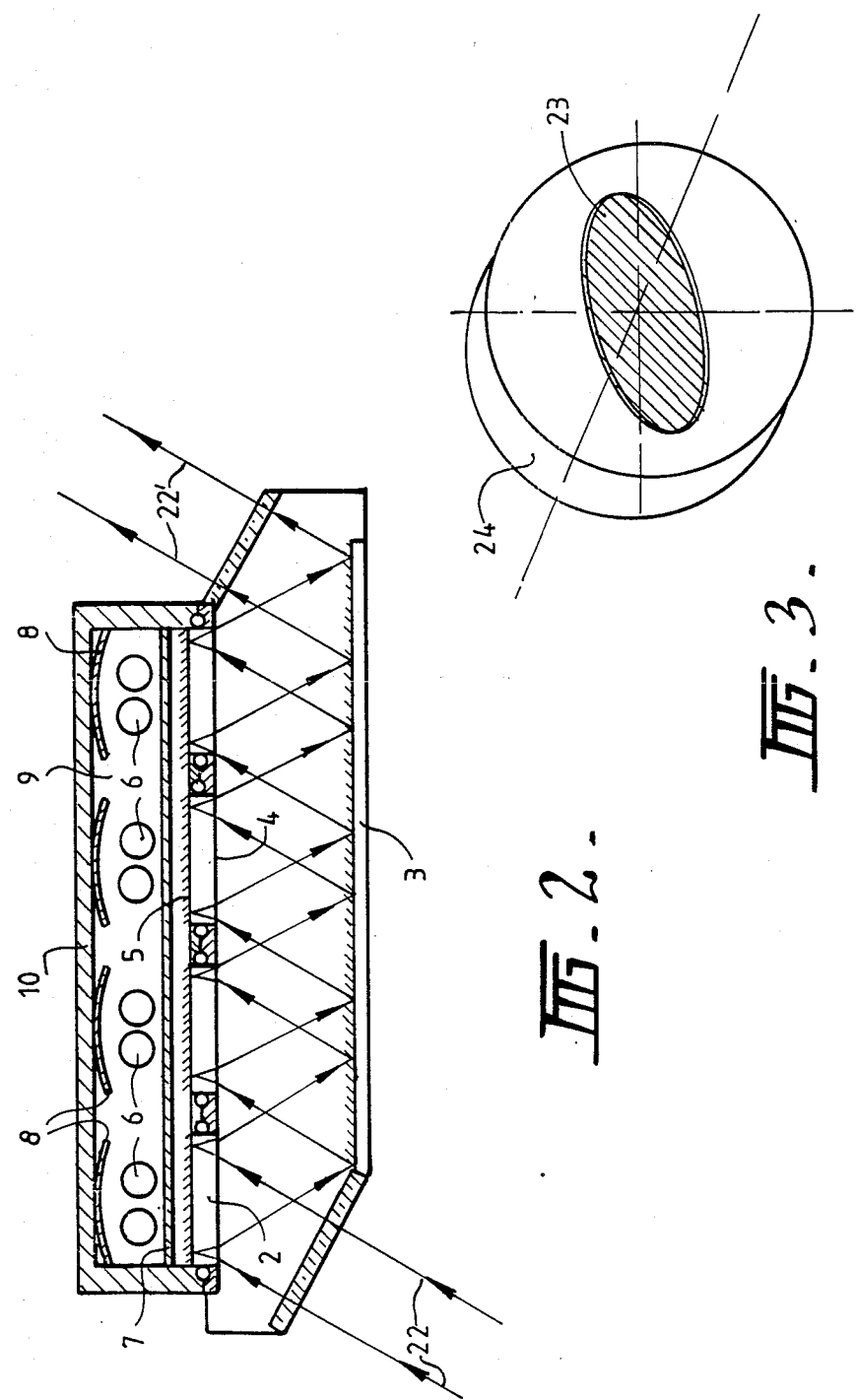

EXTERNAL CAVITY SLAB LASERS

This application is a continuation of application Ser. No. 882,678, filed July 7, 1986, now abandoned.

FIELD OF THE INVENTION

This invention relates to an external cavity slab laser system which can be operated in either a continuous or pulsed lasing mode consisting of one or more sections of a solid laser medium cut into a rectangular block whose length is greater than its width and whose thickness is small enough so as to ensure adequate cooling during operation, the two large faces of said laser medium block being optically polished, one being coated with a dielectric laser mirror whilst the other is anti-reflection coated at the laser wavelength, said block laser medium being optically excited via the mirrored surface using the filtered output of water cooled arc lamps, flashtubes or light emitting diode arrays, the laser beam undergoing amplification being directed into said block laser medium, via the anti-reflection coated surface to be reflected off the mirrored surface out of said laser medium block to be reflected off a second laser mirror, separated from and positioned parallel to the said anti-reflection coated surface, back into the same or similar laser block medium where said laser beam is amplified during each passage through said block laser medium.

The invention has applications in medical systems, industrial workstations, defence systems and in scientific research.

SUMMARY OF THE PRIOR ART

Prior art slab laser systems utilizing a single slab are of the so called "zig-zag" format, where a slab block laser medium has two optically polished surfaces with the laser beam undergoing amplification along a path formed inside said slab via multiple reflections off said polished surfaces. A major difficulty exists with such prior art slab laser systems because the thickness of said slabs have to be greater than the diameter of the laser beam undergoing amplification within said slab. The thicker the laser medium slab becomes the more difficult it is to cool and maintain distortion free. Any distortion of the laser block medium in turn distorts the laser beam undergoing amplification. A second problem with prior art single slab laser systems is the long "zig-zag" optical amplification path, which, at high peak powers in limited diameter laser beams undergoing amplification, is condusive to self-focussing of said beams resulting in the destruction of said prior art systems. The present invention overcomes the defects of prior art "zig-zag" slab lasers in that the laser beam undergoing amplification propagates between two laser mirrors with the space between said mirrors having only a small portion of it occupied by the laser medium, the remainder being filled by air, a gas such as nitrogen or evacuated. In this way, the diameter of the laser beam of this invention is not limited by the thickness of the slab laser block gain medium but by its width which does not critically affect the cooling problems.

Furthermore, the problem of self-focussing is significantly reduced because there is no continuous path within the laser gain medium, with severely restricted beam diameter, to favour the self-focussing of intense laser beams.

Prior art multiple slab laser systems have the slabs arranged themselves in a zig-zag configuration with both face and slab edge optical excitation being used, with the laser beam undergoing amplification passing directly through the optically polished slab faces. In active mirror configurations of prior art disc laser amplifiers either the active mirror discs are arranged in a "zig-zag" sequence or both active mirror discs and passive mirrors are arranged in such a sequence.

Prior art slab lasers were designed for relatively large volumes of laser media such as neodymium doped glass or glass containers containing a fluid laser medium. These prior art slab lasers are far from compact structures and can only be fired infrequently due to severe cooling problems.

The present invention overcomes the compactness problems of prior art systems by allowing limited dimensioned, laser crystal slabs to be utilized to full effect within a slab laser structure using a single slab and single mirror for the amplification of laser beams of circular cross-section and a sequence of this slab and mirror combination for the amplification of laser beams of elliptical cross-section.

BACKGROUND OF THE INVENTION

The inventor began the study of laser amplifiers in 1962 as a means of generating powerful laser beams to study photo-photon and photon-particle interactions (Nature, May 1963). It soon became clear that the required laser amplifier had to be of the exponential form (Applied Optics 1967) in order to maintain laser beam amplification at a constant intensity and to minimise self-focussing effects within the laser amplifier medium. To avoid thermally induced distortions of the exponential amplifier medium and also to facilitate its optical excitation, it was necessary to segment the laser medium.

It was found that this could be done in two ways either parallel to the direction of propagation of the laser beam or perpendicular to said propagation direction. It was discovered that parallel segmentation of the exponential amplifier could best be achieved via the use of optical fibres and one of the earliest experiments utilizing optical fibres for this task were undertaken by the inventor at the Royal Radar Establishment, Malvern, UK in 1963, an effort which eventually led to the classification of the inventor's phased-array laser amplifier system by the U.S. Patent Office in August 1984.

By segmenting the exponential amplifier (Applied Optics 1967) perpendicular to the direction of the laser beam, solid slabs of lasing medium resulted which led to the folded, active mirror exponential amplifier described in two United States patents issued during the 1970's.

These prior art, segmented exponential laser amplifier inventions were designed specifically for the production of very high peak power laser outputs exciting $10^{15}$ watts per pulse for the study of photon-photon and photon-particle interaction physics. The present invention is designed specifically for compact slab laser systems for use in medical applications and industrial applications in particular where laser beams both pulsed and continuous wave are required at much more modest power levels.

The inventor has pursued the experimental study of associated technologies since 1963 and has been successful in operating open cavity single slab amplifiers of various dimensions up to 100 mm × 20 mm × 7.5 mm all flashtube excited.

OBJECTS OF THE INVENTION

An object of the invention is to provide a very compact, open cavity slab laser system which can fully utilize the relatively small laser ion doped crystalline slabs currently available in a manner that minimises the number of moveable parts whilst providing for adequate optical excitation and fluid cooling of the laser slab medium.

Another object of the invention is to provide a means of multipassing a slab laser medium with a laser beam to be amplified in such a manner that the separation between two reflecting mirrors is only partly filled by the lasing medium.

It is an object of the invention to provide for the amplification of a laser beam of circular cross-section matching the width of the laser slab gain medium, via multiple reflections between two laser mirrors, one of said mirros being deposited on the back, optically polished face of said slab medium and the other laser mirror being positioned away from the front, optically polished and anti-reflection coated front face of said slab laser medium such that said laser beam undergoing amplification can traverse the length of said laser slab.

Another object of the invention is to amplify a laser beam of elliptical cross-section utilizing a series of slabs and a single laser mirror in both pulsed and continuous wave modes.

Another object of the invention is to amplify a laser beam of elliptical cross-section using a series of single slab single mirror combinations.

It is an object of the invention to seal a slab of laser medium into a water cooled flashtube and optical filter housing with a flexible ring placed around the circumference of the slab such that the water cooling of only the rear, active mirrored slab can be achieved without the cooling fluid seeping out onto the front surface of said slab allowing for the maximum utilization of said slab for the amplification of laser beams of both circular and elliptical cross-section.

Yet another object of the invention is to provide means of optically exciting the slab laser medium with incoherent light which matches the absorption banks of the lasing ions.

It is also an object of the invention to provide adequate fluid cooling of the slabs to allow both repetitively pulsed and continuous wave operation to high power levels.

It is an object of the invention to generate laser beams of elliptical cross-section by utilization of laser mirrors of elliptical cross-section.

BRIEF DESCRIPTION OF THE INVENTION

A better understanding of the invention may be obtained from the following description of the invention taken in conjunction with the drawings which are not meant to limit the scope of the invention in any way.

FIG. 2 is a schematic of the cross-section of the invention with multiple slabs and a single passive mirror.

FIG. 3 shows a laser oscillator resonator mirror of elliptical cross-section deposited on a mirror substrate of circular cross-section for the production of laser beams of elliptical cross-section.

DETAILED DESCRIPTION OF THE INVENTION

Figure 1:
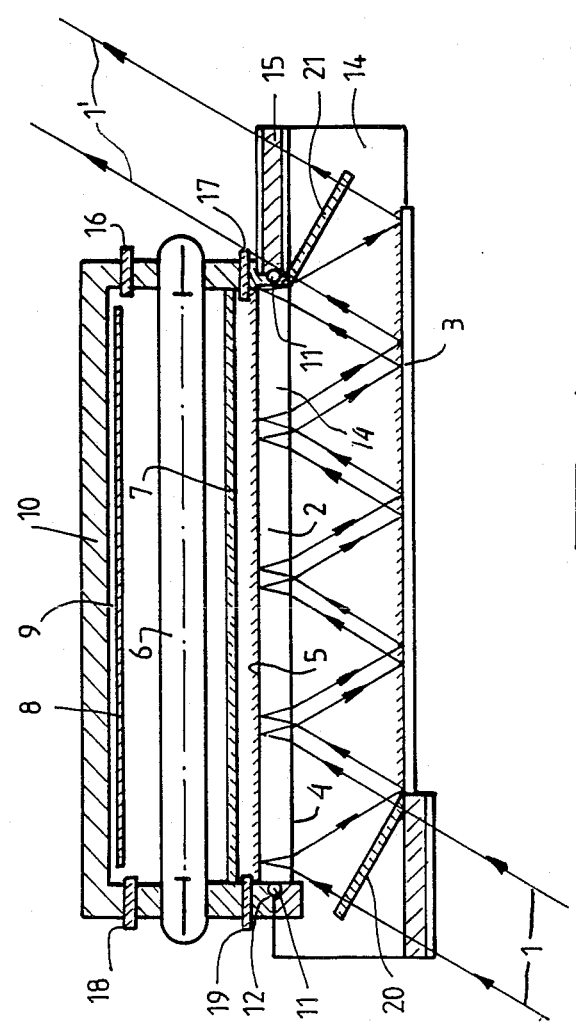
FIG. 1 is a schematic of the cross-section of the invention consisting of a flashtube excited, water cooled single slab and its accompanying passive mirror all enclosed in a double windowed chamber to maintain the best possible cleanliness.

In FIG. 1 numeral 1 indicates the laser beam of circular or elliptical cross-section to be amplified in the invention, the maximum dimension of said beams being determined by the width of the laser slab medium indicated by numeral 2.

Numeral 3 indicates the single passive mirror which redirects the laser beam into slab 2 via the optically polished, anti-reflection coated face indicated by numeral 4, so that it is reflected off a laser mirror indicated by numeral 5 deposited onto the rear optically polished face of slab 2. Slab 2 is optically excited using either arc lamps of flashtubes indicated by numeral 6 whose broad band light output is filtered by a reflective-absorptive optical filter indicated by numeral 7. Numeral 8 indicates a water cooled reflector which redirects a portion of the flshtube light back through filter 7. Numeral 9 indicates the water flow which can flow parallel or perpendicular to the lasing axis of the slab 2. Numeral 10 indicates the water cooled housing for tube 6, reflection-absorptive filter 7, at reflector 8 and slab 2. Slab 2 is sealed into housing 10 via the flexible ring indicated by numeral 11 which is held in the body of 10 by the step indicated by numeral 12 to provide a watertight seal with minimum distortion of the slab 2.

Numeral 14 indicates a gas filled enclosure with entrance and exit windows indicated by numeral 15. Numerals 16 and 17 indicate the inputs for the fluid cooling slab 2 and flashtube 6 respectively whilst numerals 18 and 19 indicate the respective exit outlets for the cooling fluid. Numeral 20 indicates the position of a 100% reflecting laser mirror and numeral 21 indicates the boundaries of the optical laser resonator necessary for the continuous wave operation of the invention.

In FIG. 2, numeral 22 indicates a laser beam of elliptical cross-section which matches the slab 2 with its major axis matching the length of slab 2 whilst its minor axis matches its width.

In this configuration of the invention the orientation of slabs 2 relative to passive mirror 3 allows for the amplification of a laser beam of elliptical cross-section such that the whole elongated slabs 2 are involved in the amplicification of the beam 22 during the single passage of said beam through said slab.

In FIG. 3, numeral 23 indicates a dielectric laser mirror of elliptical cross-section deposited on an optically polished substrate 24 of circular cross-section which can fit easily into standard mirror mounts.

The invention has configurations limited to specific applications. In the pulsed amplifier mode the invention is limited by damage to the slab itself. For example, five circular beam footprints along the long axis of the slab will increase the input peak power by a factor of 6 to 10 times by bringing the beam intensity up to damage threshold. On the other hand in the configuration of FIG. 2 with elliptical beam profiles will allow the whole slab to contribute to the amplification of a single beam so that peak powers of between times 10 and times 100 input beam power is possible. In the continuous wave mode the invention is slab excitation limited rather than beam intensity limited so that a larger number of slabs can be used to generate multi-kilowatt continuous output without damaging any slab yet reducing the excitation loading on each slab.

The invention has application in medical apparatus, industrial workstations, defence ranging and target designation systems and in scientific research.

Modifications may be made to the above without departing from the scope of the invention.

I claim:

1. An external cavity, single slab laser system comprising three sections, namely, a slab laser medium for amplifying a laser beam, a source of optical radiation which excites said slab, said slab laser medium being cut into the shape of a rectangular block whose length is greater than its width and whose thickness is less than the diameter of the laser beam to be amplified, two large faces defined by the length and width of said block being optically polished, one of the said faces being coated with the dielectric laser mirror while the other face is anti-reflection coated at the laser wavelength, said block laser medium being optically excited through the said laser mirror using the filtered optical output of water cooled lamps, the laser beam undergoing amplification being directed into the said block laser medium via the said anti-reflection coated face to be reflected off the said laser mirror out of said laser medium block via the anti-reflection coated face to be reflected off a second laser mirror, separated from, and positioned parallel to, the said anti-reflecting coated surface, back into the said laser block medium where the said laser beam is amplified during each passage through said block laser medium, the said second laser mirror being spaced from said anti-reflection coated face of said block so that said laser beam reflection off said second laser mirror is directed back into said block.

2. An external cavity slab laser system as claimed in claim 1, where the water cooled lamps comprise an array of flashtubes.

3. An external cavity slab laser system as claimed in claim 1, where the water cooled lamps comprise an array of arc lamps.

4. an external cavity slab system as claimed in claim 1, where the water cooled lamps comprise an array of diodes.

5. An external cavity multi-slab laser system comprising a series of solid block laser media, all aligned in the same plane and each of the said block laser media being optically excited through one of their two largest faces and a mirror placed on the opposite side of the said block laser media to the said optical excitation sources all of the said slabs being cut into rectangular blocks whose length is greater than their widths and whose thickness is less than the diameter of the laser beam to be amplified, the two large faces of each of the said laser media blocks being optically polished, one of the said faces being coated with a dielectric laser mirror while the other large faces are anti-reflection coated at the laser wavelength, said block laser media being optically excited through the said laser mirror using the filtered output of water cooled lamps, the laser beam undergoing amplification being directed into each of said block laser media via the said anti-reflection coated face to be reflected off the said laser mirror out of the said laser block media via the antireflection coated face to be reflected off a single second laser mirror separate from a position parallel to said anti-reflection coated faces, into the next laser medium block in the array of laser medium block where the laser beam undergoes further amplification, the said second single mirror being spaced from said anti-relection coated faces of laser blocks so that said laser beam reflected off said second mirror is directed back into the next laser block medium in the array of blocks.

6. An external cavity slab laser system as claimed in claim 5, where the water cooled lamps comprise an array of flashtubes.

7. An external cavity slab laser system as claimed in claim 5, where the water cooled lamps comprise an array of arc lamps.

8. An external cavity slab laser system as claimed in claim 5, where the water cooled lamps comprise an array of diodes.

9. An external cavity slab laser system as claimed in claim 1, where the laser mirror is in control with the anti-reflection coated surface of said laser block medium.

* * * * *